UNITED STATES PATENT OFFICE.

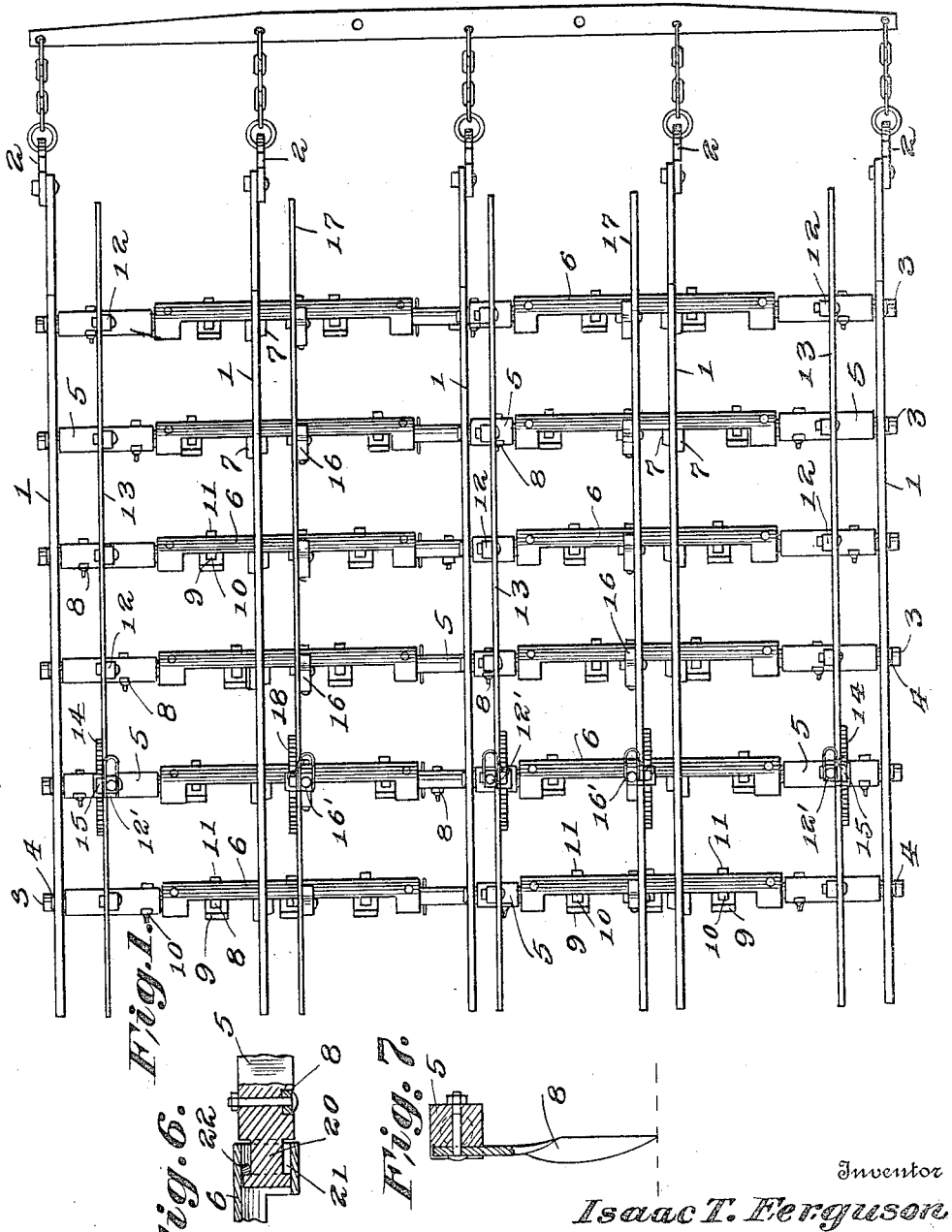

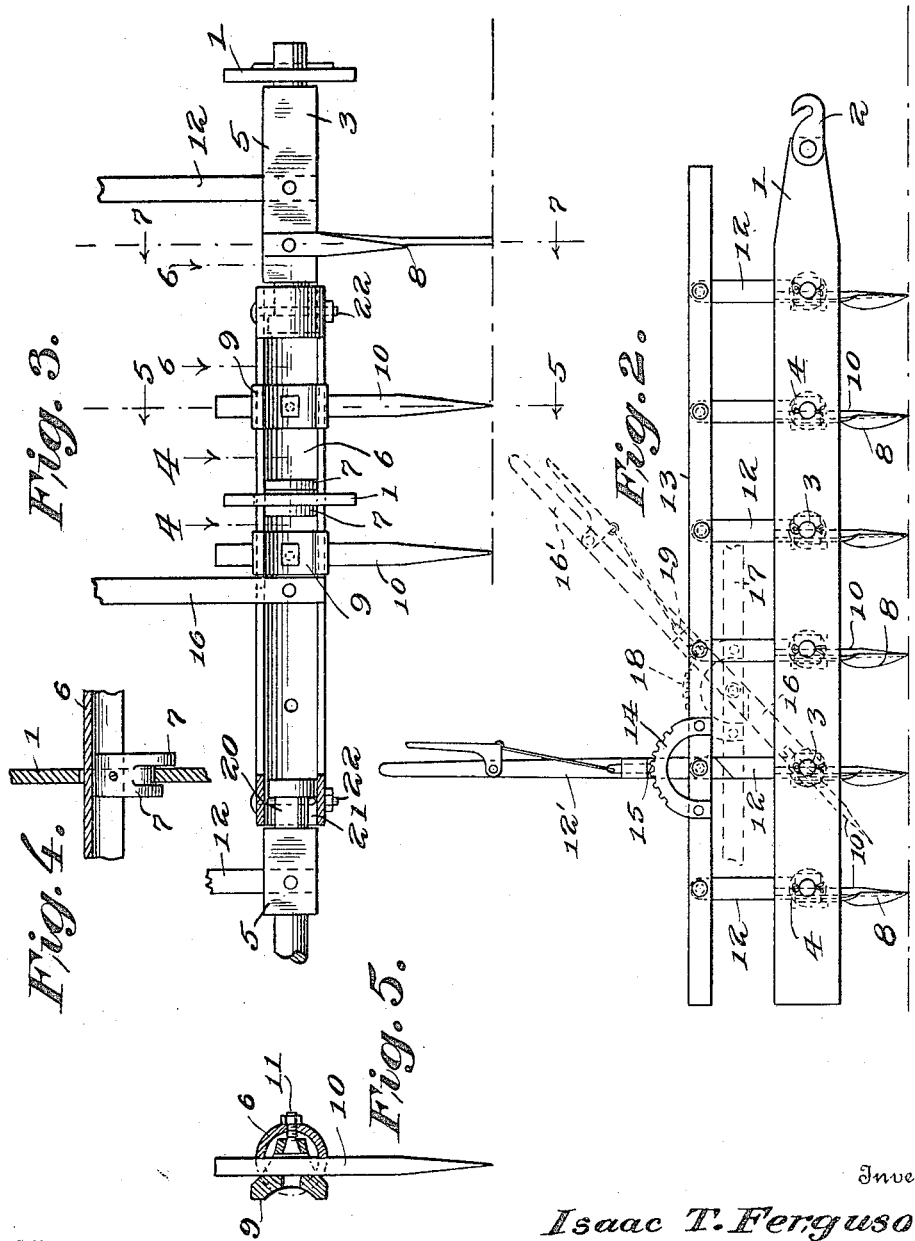

ISAAC THOMAS FERGUSON, OF TIPTONVILLE, TENNESSEE.

CULTIVATOR OR HARROW.

1,204,422.   Specification of Letters Patent.   Patented Nov. 14, 1916.

Application filed March 10, 1916. Serial No. 83,400.

*To all whom it may concern:*

Be it known that I, ISAAC THOMAS FERGUSON, a citizen of the United States, residing at Tiptonville, in the county of Lake and State of Tennessee, have invented new and useful Improvements in Cultivators or Harrows, of which the following is a specification.

This invention relates to cultivators or harrows and it consists in the novel features hereinafter described and claimed.

An object of the invention is to provide an implement of the character stated which is especially adapted to be used for preparing or cultivating the soil for a crop which soil has been used previously for growing cotton.

With this object in view the structure includes a series of parallel bars disposed longitudinally of the implement and in which are journaled a number of parallel shafts. Each shaft is made up of a series of sections and one section is journaled in each of the said bars. The adjacent sections of the said shafts are connected together whereby the various sections may be turned independently of each other and means are provided for turning the corresponding sections of all of the shafts simultaneously and for holding the said shaft sections at adjusted positions. Some of the shaft sections carry cutting blades which are adapted to penetrate the hills or rows in which plants have been standing while the intervening shaft sections carry harrow teeth adapted to work in the loose soil between the said hills and rows and cultivate the same.

In the accompanying drawing:—Figure 1 is a top plan view of the harrow or cultivator. Fig. 2 is a side elevation of the same. Fig. 3 is a fragmentary rear view with parts in section. Fig. 4 is a detail sectional view cut on the line 4—4 of Fig. 3. Fig. 5 is a similar view cut on the line 5—5 of Fig. 3. Fig. 6 is a similar view cut on the line 6—6. Fig. 7 is a similar view cut on the line 7—7.

The harrow or cultivator comprises a series of parallel bars 1 which are longitudinally disposed with relation to the implement and each of which is provided at its forward end with a pivoted clevis hook 2. Transversely disposed shafts 3 are journaled in the bars 1 and pass transversely through the same. The said shafts 3 are spaced at equal distances from each other. The outermost bars 1 are held in position upon the end portions of the shafts 3 by means of cotter pins 4 or other suitable devices.

Inasmuch as the shafts 3 are all of the same structural arrangement a description of one will suffice for all. Each shaft 3 comprises blade supporting sections 5 and harrow toothed supporting sections 6. The sections of each shaft are in axial alinement with each other and the sections 5 are journaled in each alternate bar 1 while the sections 6 are journaled in the intervening bars 1. Lugs 7 are mounted upon the sections 6 and are disposed at the opposite sides of the bars 1 in which the said sections are journaled and serve as means for preventing the said bars from becoming displaced with relation to the said sections. Cutting blades 8 are carried by the sections 5 and the said blades from the forward to the rear end of the implement are in staggered relation—that is to say the blade on one section is in the vicinity of one end thereof while the blade on the next adjacent section is in the vicinity of the opposite end of the next section and so on throughout the series of blades 8 from the forward to the rear end of the implement. Suitable clips 9 are mounted upon the sections 6 and the said clips carry harrow teeth 10 of the usual pattern. The sections 6 are recessed at their rear sides and the clips 9 may be supported therein by means of bolts 11 or any other suitable securing devices which preferably pass through the forward portions of the said sections 6. Arms 12 are fixed to the sections 5 and a rod 13 is pivotally connected with the upper portions of the said arms. One of the said arms 12 is continued into a lever 12′ which may be used as means for moving the rod 13 longitudinally. Adjacent the said lever 12′ the rod 13 is provided with a dentate segment 14 and the said lever 12′ is provided with a spring pressed pawl 15 adapted to engage the teeth of the segment 14 whereby the rod 13 is held at an adjusted position. Inasmuch as the said rod 13 is pivotally connected with the lever 12′ and the arms 12 when the said lever 12′ is swung the arms 12 are turned about the axes of the sections 5 and the said sections are turned whereby the blades 8 may be raised or lowered. The sections 5 may be turned to such an extent as to bring the lower or free ends of the blades 8 above the lower edges of the bars 1 or the said sections 5 may be turned so as to dispose the lower portions of the blades 8 in a downward direction whereby they may penetrate the soil as the implement is drawn over the same.

Arms 16 are fixed to the sections 6 and a rod 17 is pivotally connected with the said arms 16. One end of one of the arms 16 is extended into a lever 16' which may be used as a handle for moving the rod 17 longitudinally. The rod 17 adjacent the lever 16' is provided with a dentate segment 18 and the lever 16' carries a spring pressed pawl 19 adapted to engage the teeth of the segment 18 whereby the rod 17 may be held at an adjusted position. It is apparent that by using the lever 16' and moving the rod 17 longitudinally all of the arms 16 will be turned about the axes of the sections 6 to which they are connected and hence the said sections will be turned and the harrow teeth 10 carried thereby are raised or lowered. The sections 6 may be turned to such an extent as to bring the lower ends of the harrow teeth 10 above the lower edge of the bars 1 and out of contact with the soil. Also the said sections may be turned to project the ends of the teeth 10 below the lower edges of the bars 1 whereby the said teeth may operate in the soil as the implement is drawn over the same. It is also apparent that during the operation of cultivating or harrowing the soil the blades 8 may be lowered to a greater extent than the teeth 10 and hence they may be caused to cut deeper in the soil than the said teeth. In view of the fact that the implement is especially designed to be used for preparing soil in which cotton has previously grown, when the same is in operation the teeth 10 are moved over the hills or ridges in which the cotton plants have stood and they penetrate the soil and reduce the same to a proper state of fineness. Also the teeth 10 operate in the soil between the said rows or hills and reduce the same to small particles.

The detailed construction whereby the shaft sections 5 and the sections 6 of the same shaft are connected with each other will now be described.

The sections 5 at those ends which are adjacent the sections 6 are provided with spindles 20 journaled in the adjacent ends of the sections 6. The said spindles 20 are provided in the vicinity of their ends with grooves 21 which receive the side portions of pins 22 located and secured in the sections 6, consequently it will be seen that the sections 5 and 6 may be turned with relation to each other but the said sections are restrained against longitudinal movement with relation to each other. If desired the sections 5 may be provided with lugs similar to the lugs 7 hereinbefore described as being applied upon the section 6 in the event that it is found necessary to equip the section 5 with the said lugs 7 the said sections will prevent those bars 1 which receive the section 5 from becoming displaced with relation to the said sections which pass through them.

From the foregoing description taken in conjunction with the accompanying drawing it will be seen that a harrow or cultivator of simple and durable structure is provided and that the soil engaging implement carried upon the sections which constitute the same shaft may be while the harrow is in operation adjusted so that some of the soil engaging elements will cut deeper in the soil than the soil engaging elements on other sections. Also it will be seen that when it is desired to transport the harrow from point to point by dragging the same over the ground the shafts and the shaft sections may be turned whereby all of the soil engaging elements will be moved above the lower edges of the connecting bars and thus the implement may be drawn with the lower edges of the bars in contact with the ground or soil and transportation may be effected without interference on the part of the soil engaging elements.

Having described the invention what is claimed is:

1. A harrow or cultivator comprising parallel spaced bars, shafts journaled in the bars, said shafts being composed of sections turnably mounted with relation to each other and in axial alinement, there being means for preventing longitudinal movement of the sections with relation to each other, soil engaging elements mounted upon the sections and means for turning the corresponding sections of the several shafts simultaneously.

2. A harrow or cultivator comprising spaced parallel bars, shafts journaled in the bars and including sections in axial alinement with each other, means for preventing the sections of each shaft from becoming longitudinally displaced with relation to each other, means carried by the sections for holding the bars in proper position upon those sections which they receive, soil engaging elements carried by the harrow sections, arms mounted upon the sections of the shafts, rods pivotally connected with the arms which are mounted upon the corresponding sections of the different shafts, means for moving the rods longitudinally and means for holding the said rods at adjusted positions.

In testimony whereof I affix my signature in presence of two witnesses.

ISAAC THOMAS FERGUSON.

Witnesses:
LEE GOODMAN,
C. M. SIMMONS.

Copies of this patent may be obtained for five cents each, by addressing the "Commissioner of Patents. Washington, D. C."